(12) United States Patent
Kuzuya et al.

(10) Patent No.: US 11,117,558 B2
(45) Date of Patent: Sep. 14, 2021

(54) VEHICLE BRAKE DEVICE

(71) Applicant: ADVICS CO., LTD., Kariya (JP)

(72) Inventors: Ken Kuzuya, Kariya (JP); Tomotaka Asano, Toyota (JP); Yasuhito Ishida, Toyoake (JP); Tatsushi Kobayashi, Kariya (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 12 days.

(21) Appl. No.: 16/645,114

(22) PCT Filed: Sep. 28, 2018

(86) PCT No.: PCT/JP2018/036297
§ 371 (c)(1),
(2) Date: Mar. 6, 2020

(87) PCT Pub. No.: WO2019/065984
PCT Pub. Date: Apr. 4, 2019

(65) Prior Publication Data
US 2021/0122339 A1 Apr. 29, 2021

(30) Foreign Application Priority Data
Sep. 28, 2017 (JP) .............................. JP2017-187906

(51) Int. Cl.
*B60T 8/40* (2006.01)
*B60T 8/174* (2006.01)
(Continued)

(52) U.S. Cl.
CPC ................ *B60T 8/174* (2013.01); *B60T 8/72* (2013.01); *B60T 13/14* (2013.01); *B60T 13/20* (2013.01); *H02P 5/46* (2013.01)

(58) Field of Classification Search
CPC . B60T 8/174; B60T 8/72; B60T 13/14; B60T 13/20; B60T 8/4045; B60T 13/662; H02P 5/46; H02P 27/085
See application file for complete search history.

(56) References Cited

U.S. PATENT DOCUMENTS 6,095,620 A * 8/2000 Dillard .................... B60T 8/405
303/11
6,499,813 B1 * 12/2002 Wandel ................. B60T 8/4036
303/11

(Continued)

FOREIGN PATENT DOCUMENTS

JP         2007216774 A      8/2007

OTHER PUBLICATIONS

International Search Report (PCT/ISA/210) dated Dec. 4, 2018, by the Japanese Patent Office as the International Searching Authority for International Application No. PCT/JP2018/036297.
(Continued)

*Primary Examiner* — Thomas W Irvin
(74) *Attorney, Agent, or Firm* — Buchanan Ingersoll & Rooney PC

(57) ABSTRACT

This vehicle brake device comprises: a simultaneous driving determination section which determines whether it is necessary to simultaneously drive an upstream-side motor and a downstream-side motor; and a PWM control section which, when the determination result by the simultaneous driving determination section is in the affirmative, changes the duty ratio of the PWM signal to be output to the upstream-side motor so as to be smaller than when the determination result by the simultaneous driving determination section is in the negative, and uses PWM control to drive the upstream-side motor.

12 Claims, 5 Drawing Sheets

(51) Int. Cl.
*B60T 8/72* (2006.01)
*B60T 13/14* (2006.01)
*B60T 13/20* (2006.01)
*H02P 5/46* (2006.01)

(56) References Cited

U.S. PATENT DOCUMENTS

| | | | | |
|---|---|---|---|---|
| 7,165,818 | B2* | 1/2007 | Iwasaki | B60T 8/175 |
| | | | | 303/115.5 |
| 8,562,304 | B2* | 10/2013 | Barthel | H02P 7/28 |
| | | | | 417/44.1 |
| 8,975,857 | B2* | 3/2015 | Kawamura | H02P 27/085 |
| | | | | 318/801 |
| 9,806,650 | B1* | 10/2017 | Chu | H02P 6/06 |
| 10,230,316 | B2* | 3/2019 | Li | H02P 25/03 |
| 10,439,527 | B2* | 10/2019 | Usagawa | H02P 6/182 |
| 10,737,668 | B2* | 8/2020 | Yun | B60T 8/4081 |
| 2003/0080611 | A1* | 5/2003 | Wandel | B60T 8/4059 |
| | | | | 303/10 |
| 2005/0040704 | A1* | 2/2005 | Iwasaki | B60T 8/175 |
| | | | | 303/157 |
| 2007/0188017 | A1 | 8/2007 | Niino et al. | |
| 2011/0033322 | A1* | 2/2011 | Barthel | B60T 8/4059 |
| | | | | 417/410.1 |
| 2012/0112524 | A1* | 5/2012 | Shibata | B60T 13/146 |
| | | | | 303/10 |
| 2013/0127383 | A1* | 5/2013 | Kawamura | H02P 3/22 |
| | | | | 318/400.09 |
| 2017/0353131 | A1* | 12/2017 | Usagawa | H02P 23/0004 |
| 2018/0145614 | A1* | 5/2018 | Li | H02P 25/03 |
| 2019/0001939 | A1* | 1/2019 | Yun | B60T 8/17 |
| 2019/0016297 | A1* | 1/2019 | Saito | B60L 3/0015 |
| 2020/0172064 | A1* | 6/2020 | Yasui | B60T 7/042 |

OTHER PUBLICATIONS

Written Opinion (PCT/ISA/237) dated Dec. 4, 2018, by the Japanese Patent Office as the International Searching Authority for International Application No. PCT/JP2018/036297.

* cited by examiner

VEHICLE BRAKE DEVICE

TECHNICAL FIELD

The present invention relates to a vehicle brake device configured to apply a hydraulic-pressure braking force to a wheel, in accordance with a brake operating amount.

BACKGROUND ART

In the related art, for example, PTL 1 discloses a vehicle brake control device (hereinbelow, referred to as "conventional device"). The conventional device includes pumps each of which is configured to pressurize each wheel cylinder provided to each of front wheels and rear wheels, a first motor and a second motor provided to actuate the pumps on the front wheels-side and the pumps on the rear wheels-side, and a control means for driving the first motor and the second motor by varying a current value to be supplied to each of the first motor and the second motor. In the conventional device, the control means is adapted to increase the current value upon drive start points of the first motor and the second motor to drive the first motor and the second motor to the full extent until a predetermined time elapses, and to change the current value from a current value upon the drive to the full extent to a current value corresponding to a target wheel pressure when the predetermined time elapses.

CITATION LIST

Patent Literature

PTL 1: JP-A-2007-216774

SUMMARY OF INVENTION

Technical Problem

In general, when driving a motor, rush current is generated in which current to be supplied to the motor temporarily increases immediately after the drive starts. In the conventional device, when driving the first motor and the second motor at the same time, a timing at which the rush current of the first motor is generated and a timing at which the rush current of the second motor is generated may overlap. When the timings overlap, total rush current obtained by summing the respective rush currents imposes high burden (load) on a battery configured to supply power (current). For this reason, in the conventional device, there is room for improvement in reduction in total rush current that is generated when driving the first motor and the second motor at the same time.

The present invention has been made in view of the above situation. That is, an object of the present invention is to provide a vehicle brake device capable of reducing a total rush current obtained by summing respective rush currents that are generated when driving a first motor and a second motor at the same time, even though generation timings of the rush currents overlap.

Solution to Problem

In order to achieve the above object, a vehicle brake device of the present invention is a vehicle brake device including a first pressurization device configured to pressurize and supply an operating fluid by drive of a first electric motor, a second pressurization device configured to pressurize and supply the operating fluid by drive of a second electric motor, and a control device configured to control the drives of the first electric motor and the second electric motor via a drive circuit connected to each of the first electric motor and the second electric motor, wherein the operating fluid pressurized by at least one of the first pressurization device and the second pressurization device is supplied to a wheel cylinder provided to a wheel of a vehicle, so that the wheel is applied with a hydraulic-pressure braking force. The control device includes a simultaneous driving determination section configured to determine whether it is necessary to drive the first electric motor and the second electric motor at the same time, and a PWM control section that, when a result of the determination by the simultaneous driving determination section is in the affirmative, changes a duty ratio of a PWM signal, which is to be output to at least one electric motor of the first electric motor and the second electric motor, so as to be smaller than a duty ratio when a result of the determination by the simultaneous driving determination section is in the negative and drives the electric motor by PWM control.

Advantageous Effects of Invention

According to the configuration, when a result of the determination by the simultaneous driving determination section is in the affirmative (i.e., the first electric motor and the second electric motor are to be driven at the same time), the PWM control section may drive at least one electric motor of the first electric motor and the second electric motor by the PWM control in which the duty ratio has been changed so as to be smaller than the duty ratio when a result of the determination is in the negative (i.e., the first electric motor and the second electric motor are not to be driven at the same time). Thereby, even when driving the first electric motor and the second electric motor at the same time, it is possible to reduce rush current of the electric motor that is to be driven by the PWM control, and to reduce total rush current at the time when generation timings of the rush current overlap.

DESCRIPTION OF EMBODIMENTS

Figure 1:
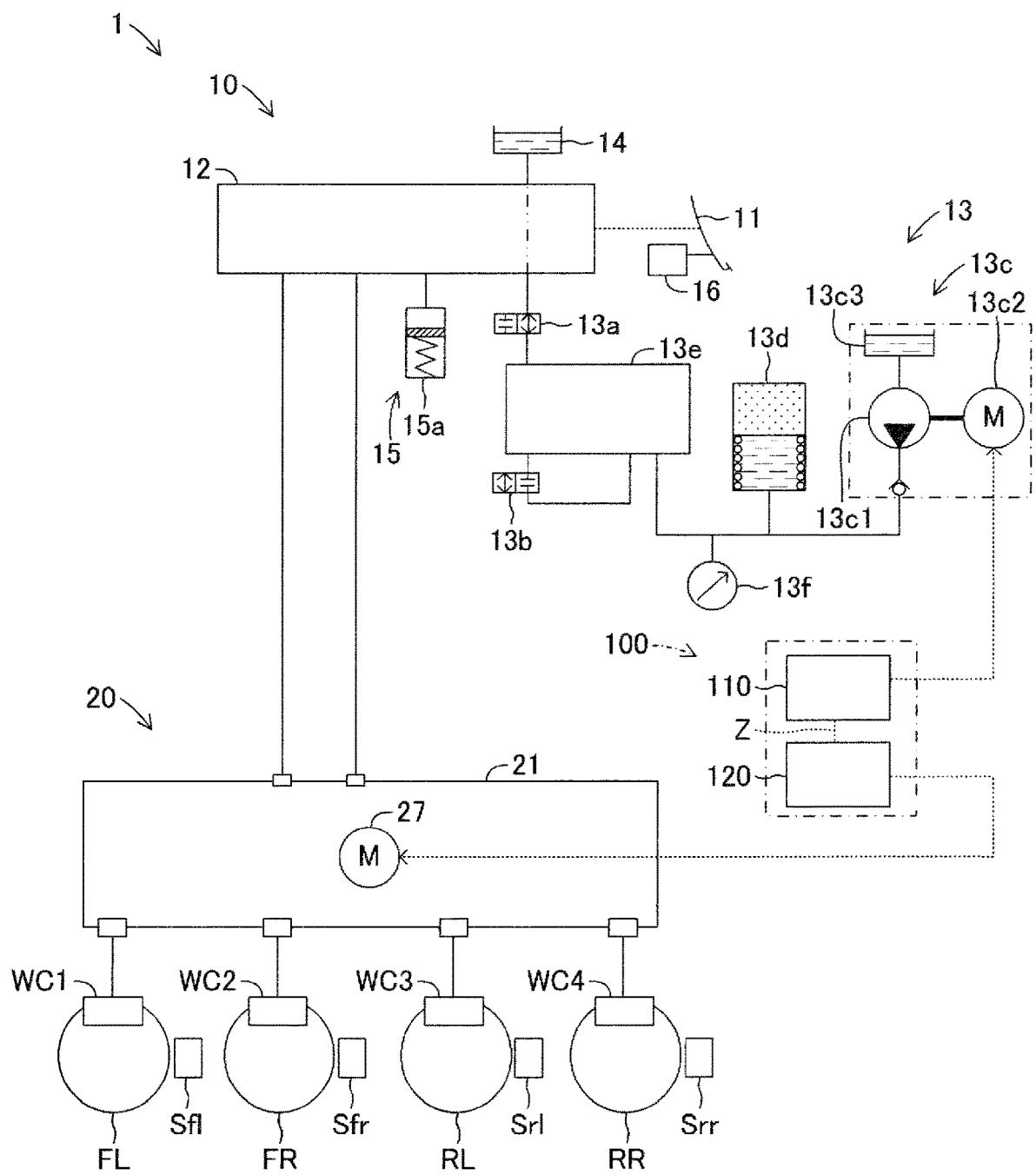
FIG. 1 depicts a configuration of a hydraulic-pressure braking force generating device as a vehicle brake device in accordance with an embodiment of the present invention.

Hereinbelow, an embodiment of a vehicle brake device of the present invention will be described with reference to the drawings. In the embodiment and modified embodiments thereof below, the same or equivalent parts are denoted with the same reference signs in the drawings. Also, each drawing used for description is a conceptual view, and a shape of each part may not be exact all the time.

As shown in FIG. 1, the vehicle brake device includes a hydraulic-pressure braking force generating device 1 configured to brake a vehicle by applying a hydraulic-pressure braking force to each of wheels FL, FR, RL and RR, and a brake control device 100 as a brake device configured to control an operation of the hydraulic-pressure braking force generating device 1. The hydraulic-pressure braking force generating device 1 includes an upstream-side pressurization device 10 as a first pressurization device configured to generate a master cylinder pressure corresponding to a brake operating amount as a result of a depressing operation on a brake pedal 11, and a downstream-side pressurization device 20 as a second pressurization device configured to generate a control pressure independent of the master cylinder pressure. Also, the brake control device 100 includes a first control section 110 configured to control drive of a pump motor 13$c$2 of the upstream-side pressurization device 10, and a second control section 120 configured to control drive of a pump motor 27 of the downstream-side pressurization device 20.

The upstream-side pressurization device 10 is configured to generate a master cylinder pressure corresponding to a brake operating amount, specifically, a brake operating force as a result of a depressing operation on the brake pedal 11 by a master cylinder 12. The master cylinder 12 is connected to a servo pressure generating device 13 that is a boosting device configured to adjust and boost (increase) the brake operating force.

The servo pressure generating device 13 includes a pressure decreasing control valve 13$a$, a pressure increasing control valve 13$b$, a pressure supply section 13$c$, an accumulator 13$d$ and a regulator 13$e$. The pressure decreasing control valve 13$a$ is a normally-open electromagnetic valve that is opened in a non-energization state, and a flow rate (or pressure) thereof is controlled by the first control section 110. The pressure decreasing control valve 13$a$ is provided on a flow path interconnecting the regulator 13$e$ and a reservoir 14. The pressure increasing control valve 13$b$ is a normally-closed electromagnetic valve that is closed in a non-energization state, and a flow rate (or pressure) thereof is controlled by the first control section 110. The pressure increasing control valve 13$b$ is provided on a flow path interconnecting one and other end of the regulator 13$e$.

The pressure supply section 13$c$ is configured to pressurize an operating fluid and to supply a high-pressure operating fluid to the regulator 13$e$. The pressure supply section 13$c$ includes a pump 13$c$1, a pump motor 13$c$2 as a first electric motor, a reservoir 13$c$3, and the like. The pump 13$c$1 is driven by the pump motor 13$c$2 to pump up and pressurize the operating fluid reserved in the reservoir 13$c$3 and to pneumatically transport (supply) the high-pressure operating fluid to the accumulator 13$d$, the regulator 13$e$ and the master cylinder 12. The drive of the pump motor 13$c$2 is controlled by the first control section 110, as described later. Herein, in descriptions below, the pump motor 13$c$2 is also referred to as "upstream-side motor 13$c$2". The reservoir 13$c$3 is to reserve therein the operating fluid that is to be supplied to the accumulator 13$d$.

The accumulator 13$d$ as an accumulator device is configured to accumulate a hydraulic pressure of the operating fluid in a high-pressure state, and to supply the high-pressure operating fluid to the regulator 13$e$ and the master cylinder 12. A pressure sensor 13$f$ is provided on a flow path interconnecting the accumulator 13$d$ and the regulator 13$e$. The pressure sensor 13$f$ is configured to detect an accumulator pressure Pa of the accumulator 13$d$, and to transmit a detection signal to the first control section 110. In the meantime, the accumulator pressure Pa correlates with a reserved amount of the high-pressure operating fluid accumulated in the accumulator 13$d$.

Herein, when the accumulator pressure Pa of the accumulator 13$d$ is lowered, the first control section 110 drives the upstream-side motor 13$c$2, which is the first electric motor, i.e., actuates the pump 13$c$1, based on a detection value input from the pressure sensor 13$f$. Thereby, the upstream-side motor 13$c$2 is driven, so that the pump 13$c$1 pressurizes the operating fluid pumped up from the reservoir 13$c$3 and pneumatically transports (supplies) the operating fluid to the accumulator 13$d$, thereby recovering the accumulator pressure Pa to a predetermined hydraulic pressure or higher (a second predetermined accumulator pressure Pd1 or higher, which will be described later).

The regulator 13$e$ includes a cylinder, a control piston, a spring and the like (not shown). The regulator 13$e$ is configured to cause the operating fluid of a flow rate, which corresponds to a differential pressure between a pilot pressure in a pilot chamber formed together with the control piston in the cylinder and a servo pressure in a servo chamber (not shown) formed in the master cylinder 12, to flow into and out of the servo chamber.

Also, the upstream-side pressurization device 10 includes a reactive force generating device 15. The reactive force generating device 15 is a device communicatively connected to the master cylinder 12 and configured to generate a reactive force against an operating force, which is generated when the brake pedal 11 is operated. The reactive force generating device 15 is mainly configured by a stroke simulator 15$a$. The stroke simulator 15$a$ includes a cylinder, a piston and a spring, and enables an operation of the brake pedal 11 as the piston is moved against an urging force of the spring, in response to an operation on the brake pedal 11.

Also, the upstream-side pressurization device 10 includes a stroke sensor 16. The stroke sensor 16 is configured to detect an operating amount (stroke) by which the brake pedal 11 is operated, and to transmit a detection signal to the first control section 110 and the second control section 120.

Figure 2:
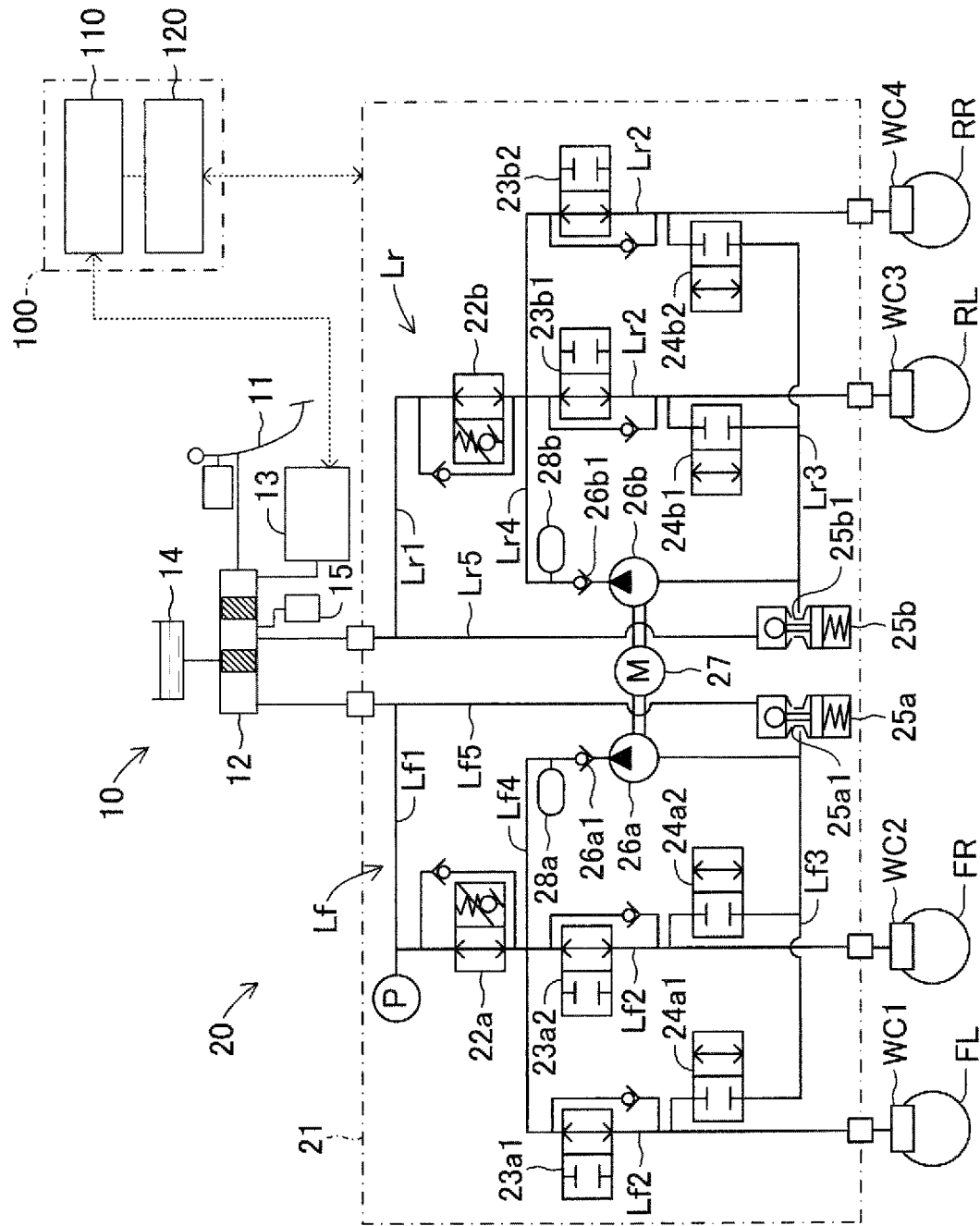
FIG. 2 depicts a configuration of a downstream-side pressurization device of FIG. 1.

The downstream-side pressurization device 20 is operation-controlled by the second control section 120, and mainly includes an actuator 21 configured to control wheel pressures of wheel cylinders WC1, WC2, WC3 and WC4. The actuator 21 is well known, and as shown in FIG. 2, is configured by packaging hydraulic-pressure control valves 22$a$ and 22$b$, pressure increasing control valves 23$a$1, 23$a$2, 23$b$1 and 23$b$2, pressure decreasing control valves 24$a$1, 24$a$2, 24$b$1 and 24$b$2, pressure adjusting reservoirs 25$a$ and 25$b$, pumps 26$a$ and 26$b$, the pump motor 27 as the second electric motor, and the like into one case.

First, a configuration of a front wheel system of a brake actuator 25 is briefly described. An oil path Lf is provided thereon with the hydraulic-pressure control valve 22$a$. The hydraulic-pressure control valve 22$a$ is controlled to be switched between a differential pressure generating state and a differential pressure solving state by the second control section 120. The hydraulic-pressure control valve 22$a$ is normally in a cutoff state and can form a differential pressure generating state in which an oil path Lf2 on the wheel cylinders WC1 and WC2—side has a pressure higher than that of an oil path Lf1 on the master cylinder 12—side by a control differential pressure, as the control pressure increases. In the meantime, the hydraulic-pressure control valve 22$a$ can form a differential pressure solving state in which the oil path Lf2 on the wheel cylinders WC1 and WC2—side and the oil path Lf1 on the master cylinder 12—side are substantially the same, as the control pressure is held or decreases. The control differential pressure is adapted to be adjusted by the second control section 120, in accordance with control current. In the differential pressure solving state, the pressure decreasing control valves 24a1 and 24a2 and the pressure adjusting reservoir 25a are enabled to communicate with each other, so that the operating fluid from the pump 26a is circulated to hold or decrease the control pressure.

The oil path Lf2 is bifurcated, so that one is provided with the pressure increasing control valve 23a1 configured to control pressurization of a wheel pressure in the wheel cylinder WC1 during pressurization control and the other is provided with the pressure increasing control valve 23a2 configured to control pressurization of a wheel pressure in the wheel cylinder WC2 during pressurization control. The pressure increasing control valves 23a1 and 23a2 are respectively configured as a two-position valve of which communication state or cutoff state is controlled by the second control section 120. When the pressure increasing control valves 23a1 and 23a2 are controlled to the communication state, the control pressure generated as a result of actuation of the pump 26a by drive of the pump motor 27 and control of the hydraulic-pressure control valve 22a, and/or the master cylinder pressure in the master cylinder 12 can be applied to each of the wheel cylinders WC1 and WC2.

Also, the oil path Lf2 between each of the pressure increasing control valves 23a1 and 23a2 and each of the wheel cylinders WC1 and WC2 communicates with a reservoir hole 25a1 of the pressure adjusting reservoir 25a via an oil path Lf3. On the oil path Lf3, the pressure decreasing control valves 24a1 and 24a2 of which communication state or cutoff state is controlled by the second control section 120 are respectively arranged. The pressure decreasing control valves 24a1 and 24a2 are respectively set to the communication state as appropriate by the second control section 120, thereby escaping the operating fluid to the pressure adjusting reservoir 25a through the oil path Lf3 to decrease the wheel pressure in each of the wheel cylinders WC1 and WC2.

Also, on an oil path Lf4 connecting the oil path Lf2 between the hydraulic-pressure control valve 22a and each of the pressure increasing control valves 23a1 and 23a2 and the reservoir hole 25a1 of the pressure adjusting reservoir 25a, the pump 26a is provided in parallel with the hydraulic-pressure control valve 22a, together with a relief valve 26a1. An oil path Lf5 is provided so as to connect the reservoir hole 25a1 of the pressure adjusting reservoir 25a to the master cylinder 12 via the oil path Lf1. The pump 26a is driven by the pump motor 27 as the second electric motor, in response to a command from the second control section 120. Thereby, the pump 26a is configured to pump up and pressurize the operating fluid of the reservoir 14 via the oil paths Lf1 and Lf5 and the pressure adjusting reservoir 25a, and to discharge the same to each of the wheel cylinders WC1 and WC2 via the oil paths Lf4 and Lf2 and the pressure increasing control valves 23a1 and 23a2 in the communication state, thereby applying the control pressure. In the meantime, in order to relieve pulsations of the operating fluid discharged by the pump 26a, a damper 28a is arranged upstream of the pump 26a on the oil path Lf4. Herein, in descriptions below, the pump motor 27 is also referred to as "downstream-side motor 27".

Also, a rear wheel system of the actuator 21 has a configuration similar to the above front wheel system, and an oil path Lr configuring the rear wheel system includes oil paths Lr1 to Lr5, like the oil path Lf. The oil path Lr is provided with the hydraulic-pressure control valve 22b similar to the hydraulic-pressure control valve 22a and the pressure adjusting reservoir 25b similar to the pressure adjusting reservoir 25a. The branched oil paths Lr2 and Lr2 in communication with the wheel cylinders WC3 and WC4 are provided with the pressure increasing control valves 23b1 and 23b2 similar to the pressure increasing control valves 23a1 and 23a2, and the oil path Lr3 is provided with the pressure decreasing control valves 24b1 and 24b2 similar to the pressure decreasing control valves 24a1 and 24a2. The oil path Lr4 is provided with the pump 26b, a relief valve 26b1 and a damper 28b similar to the pump 26a, the relief valve 26a1 and the damper 28a.

The pressure adjustment on the wheel pressure by the actuator 21 is implemented by performing pressure increasing control of supplying the master cylinder pressure, as it is, to the wheel cylinders WC1 to WC4, holding control of sealing the wheel cylinders WC1 to WC4, pressure decreasing control of causing the operating fluid in the wheel cylinders WC1 to WC4 to flow out to the pressure adjusting reservoirs 25a and 25b or pressurization control of pressurizing wheel pressures in accordance with actuation of the pumps 26a and 26b, which are to be driven by the pump motor 27, and differential pressure generating states of the hydraulic-pressure control valves 22a and 22b.

Also, as shown in FIG. 1, the vehicle brake device includes wheel speed sensors Sfl, Sfr, Srl and Srr. The wheel speed sensors Sfl, Sfr, Srl and Srr are respectively provided in the vicinity of the respective wheels FL, FR, RL and RR, and are configured to transmit pulse signals of frequencies corresponding to rotations of the respective wheels FL, FR, RL and RR to the first control section 110 and the second control section 120. Herein, the first control section 110 and the second control section 120 can use averaging processing or the like to detect a vehicle speed V from the pulse signals (wheel speeds) of the respective wheels FL, FR, RL and RR detected by the wheel speed sensors Sfl, Sfr, Srl and Srr, for example.

The first control section 110 and second control section 120 configuring the brake control device 100 as the control device are respectively an electronic control section (ECU) including a CPU, a memory and the like. The first control section 110 is an ECU configured to drive the servo pressure generating device 13, more specifically, the upstream-side motor 13c2 of the pressure supply section 13c, based on a target wheel pressure (or a target deceleration) that is a target value of the wheel pressure. The first control section 110 is configured to perform the pressurization control, the pressure decreasing control or the holding control for the servo pressure generating device 13, based on the target wheel pressure and the accumulator pressure Pa. In the pressurization control, the pressure increasing control valve 13b is in an opened state, and the pressure decreasing control valve 13a is in a closed state. In the pressure decreasing control, the pressure increasing control valve 13b is in a closed state, and the pressure decreasing control valve 13a is in an opened state. In the holding control, the pressure increasing control valve 13b and the pressure decreasing control valve 13a are in closed states. Also, the first control section 110 is configured to drive the upstream-side motor 13c2 of the pressure supply section 13c in a situation in which the accumulator pressure Pa in the accumulator 13d is lowered.

Figure 3:
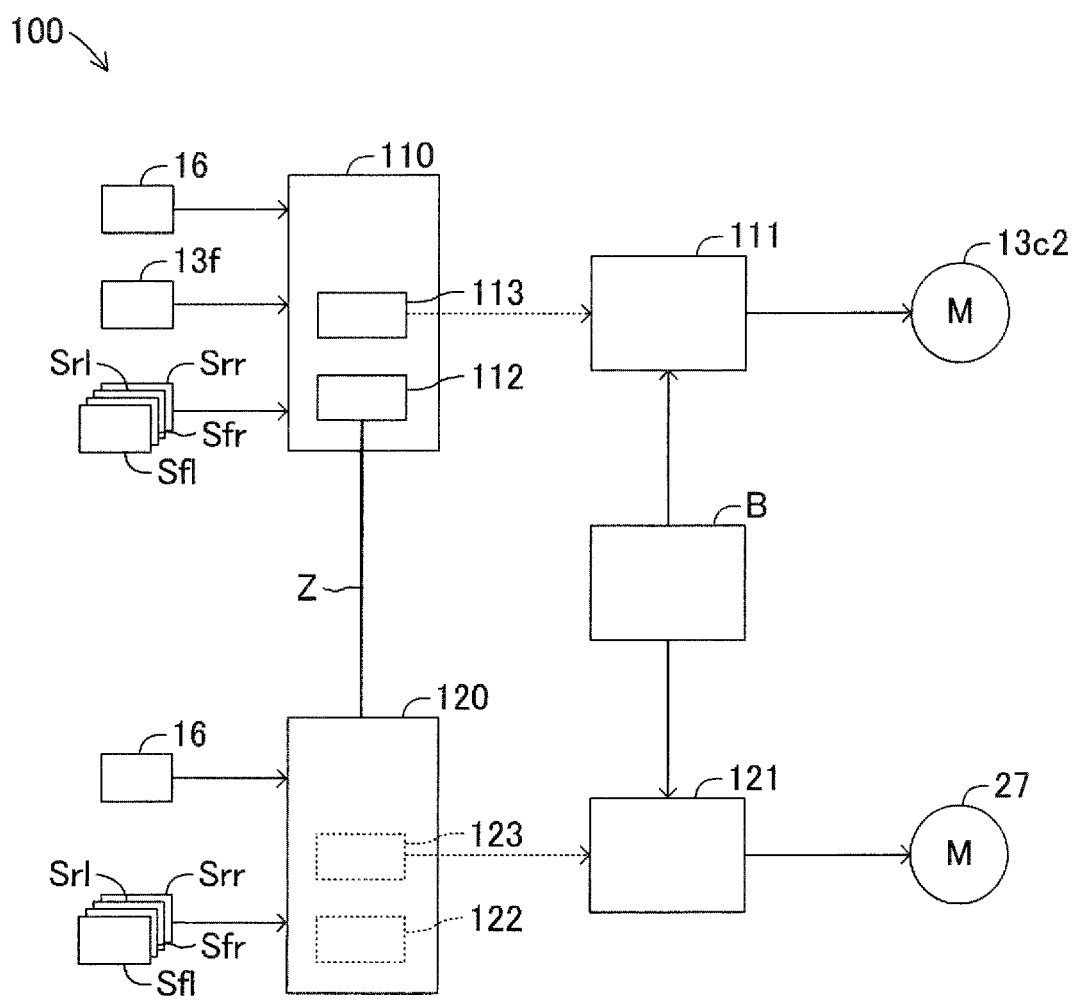
FIG. 3 depicts a configuration of a brake control device of FIG. 1.

As shown in FIG. 3, the first control section 110 is connected to diverse types of sensors such as the stroke sensor 16, the pressure sensor 13f, the wheel speed sensors Sfl to Srr, and the like. The first control section 110 is configured to acquire stroke information, servo pressure information, wheel speed information, and the like from the sensors. The sensors and the first control section 110 are interconnected by communication lines (CAN). Also, the first control section 110 is configured to control drive of the upstream-side motor 13c2 via a drive circuit 111, which is the first drive circuit for driving the upstream-side motor 13c2 that is a first electric motor of the upstream-side pressurization device 10. The drive circuit 111 is provided to a power feeding line for feeding power (current) from the battery B to the upstream-side motor 13c2, and is configured to drive the upstream-side motor 13c2 as an on/off state of a semiconductor switching element is switched, in response to a PWM signal (which will be described later) to be output from the first control section 110. The drive circuit 111 is configured to regulate current, which is to be supplied to the upstream-side motor 13c2, as a duty ratio, which indicates a ratio of an on-time (pulse width) to a PWM control period indicative of a switching frequency of an on-time and an off-time in a PWM signal, is subjected to pulse width control (the PWM control) by the first control section 110.

The second control section 120 configuring the brake control device 100 is an ECU configured to perform control on the actuator 21, based on a target wheel pressure (or a target deceleration), which is a target value of the wheel pressure. The second control section 120 is configured to perform the pressure increasing control, the pressure decreasing control, the holding control, or the pressurization control on the actuator 21, based on the target wheel pressure, as described above.

Herein, each control state by the second control section 120 is briefly described with reference to control on the wheel cylinder WC1, as an example. In the pressure increasing control, the hydraulic-pressure control valve 22a and the pressure increasing control valve 23a1 are in opened states, and the pressure decreasing control valve 24a1 is in a closed state. In the pressure decreasing control, the pressure increasing control valve 23a1 is in a closed state, and the pressure decreasing control valve 24a1 is in an opened state. In the holding control, the pressure increasing control valve 23a1 and the pressure decreasing control valve 24a1 are in closed states. In the pressurization control, the hydraulic-pressure control valve 22a is in a differential pressure generating state (throttled state), the pressure increasing control valve 23a1 is in an opened state, the pressure decreasing control valve 24a1 is in a closed state, and the downstream-side motor 27 is driven to actuate the pump 26a.

As shown in FIG. 3, the second control section 120 is connected to diverse types of sensors such as the stroke sensor 16, the wheel speed sensor Sfl to Srr, and the like. The second control section 120 is configured to acquire stroke information, wheel speed information, and the like from the sensors. The sensors and the second control section 120 are interconnected by communication lines (CAN). The second control section 120 is configured to perform anti-skid control and ABS control on the actuator 21, in accordance with a traveling state of the vehicle and a request. Also, the second control section 120 is communicatively connected to the first control section 110 by a communication line Z.

Also, the second control section 120 is configured to drive the downstream-side motor 27 via a drive circuit 121, which is a second drive circuit for driving the downstream-side motor 27 that is the second electric motor of the downstream-side pressurization device 20. The drive circuit 121 is provided to a power feeding line for feeding power from the battery B to the downstream-side motor 27, and is configured to regulate current, which is to be supplied to the downstream-side motor 27, as the duty ratio of the semiconductor switching element is subjected to pulse width control (the PWM control) by the second control section 120.

Also, in the present embodiment, the first control section 110 includes a simultaneous driving determination section 112 configured to determine whether it is necessary to simultaneously drive the upstream-side motor 13c2, which is the first electric motor of the upstream-side pressurization device 10 that is the first pressurization device, and the downstream-side motor 27, which is the second electric motor of the downstream-side pressurization device 20 that is the second pressurization device. The simultaneous driving determination section 112 is configured to acquire a motor drive state signal, which indicates whether the downstream-side motor 27 is being driven, from the second control section 120 via the communication line Z. When driving the upstream-side motor 13c2 in accordance with the accumulator pressure Pa acquired from the pressure sensor 13f, if the downstream-side motor 27 is driven or is being driven by the motor drive state signal acquired from the second control section 120, the simultaneous driving determination section 112 determines that it is necessary to drive the upstream-side motor 13c2 and the downstream-side motor 27 at the same time.

Also, in the present embodiment, the first control section 110 includes a PWM control section 113. The PWM control section 113 drives the upstream-side motor 13c2, which is at least one of the upstream-side motor 13c2 and the downstream-side motor 27, by the PWM control when a result of the determination by the simultaneous driving determination section 112 is in the affirmative, i.e., it is determined that it is necessary to drive the upstream-side motor 13c2 and the downstream-side motor 27 at the same time. Specifically, the PWM control section 113 changes a duty ratio of the PWM signal, which is to be output to the upstream-side motor 13c2, so as to be smaller than a duty ratio when a result of the determination by the simultaneous driving determination section 112 is in the negative, i.e., the upstream-side motor 13c2 is solely driven, and drives the upstream-side motor 13c2 by the PWM control.

Herein, in descriptions below, the PWM control that, in a situation in which the upstream-side motor 13c2 and the downstream-side motor 27 are driven at the same time, i.e., when a result of the determination by the simultaneous driving determination section 112 is in the affirmative, reduces the duty ratio and increases a PWM frequency to drive the upstream-side motor 13c2 (and/or the downstream-side motor 27) is referred to as "high-frequency duty control". Also, the PWM control that drives the upstream-side motor 13c2 (or the downstream-side motor 27) with a duty ratio when the upstream-side motor 13c2 (or the downstream-side motor 27) is solely driven, i.e., a result of the determination by the simultaneous driving determination section 112 is in the negative, in other words, a duty ratio greater than the duty ratio of the high-frequency duty control is referred to as "usual duty control".

In the brake control device 100 configured as described above, the first control section 110 and the second control section 120 cooperate to control operations of the hydraulic-pressure braking force generating device 1. Hereinbelow, the cooperative control is briefly described. The first control section 110 sets a target deceleration, based on the stroke information, and transmits, as control information, the target deceleration information indicative of the target deceleration to the second control section 120 via the communication line Z. Thereby, the first control section 110 and the second control section 120 cooperate to control the hydraulic pressure of the operating fluid so that the wheel pressure is to approach the target wheel pressure, i.e., the deceleration of the vehicle is to approach the target deceleration.

Subsequently, the drive control on the upstream-side motor 13c2 and the downstream-side motor 27 by the brake control device 100 configured as described above is described.

Figure 4:
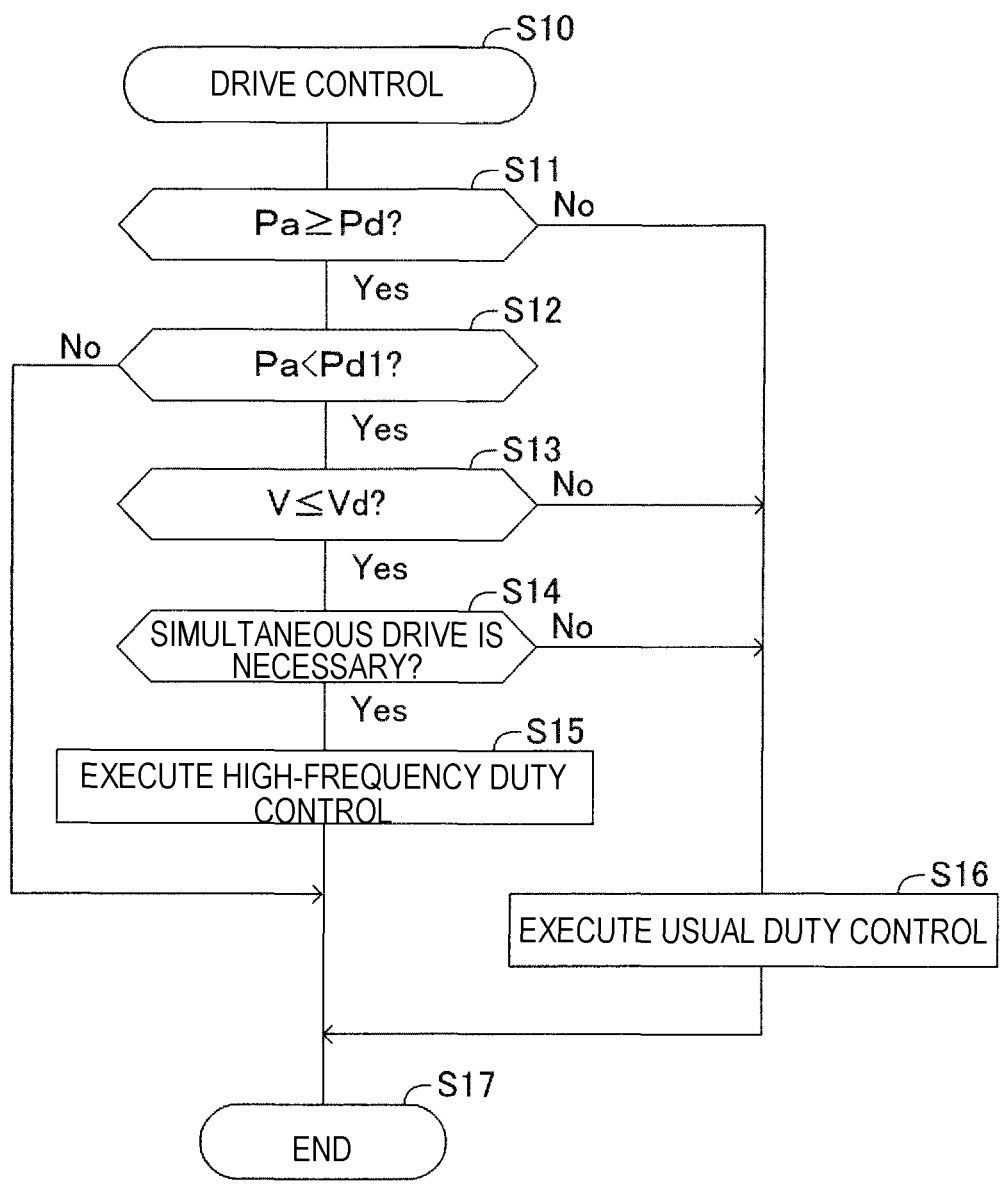
FIG. 4 is a flowchart of a drive control program that is to be executed by a first control section of FIG. 3.

In the present embodiment, the first control section 110 executes a drive control program shown in FIG. 4. The first control section 110 (more specifically, the CPU, the same hereinbelow) starts to execute the drive control program of FIG. 4 whenever a predetermined short time elapses in step S10. When the first control section 110 starts to execute the drive control program in step S10, the first control section inputs a signal, which indicates the accumulator pressure Pa in the accumulator 13d of the pressure supply section 13c, from the pressure sensor 13f, in subsequent step S11. Then, the first control section 110 (the simultaneous driving determination section 112) determines whether the accumulator pressure Pa input from the pressure sensor 13f is equal to or higher than a first preset predetermined accumulator pressure Pd (a predetermined hydraulic pressure) at which the accumulator 13d cannot supply the high-pressure operating fluid to the regulator 13e.

That is, when the accumulator pressure Pa is equal to or higher than the first predetermined accumulator pressure Pd, the first control section 110 (the simultaneous driving determination section 112) determines "Yes" because it is possible to supply the high-pressure operating fluid from the accumulator 13d to the regulator 13e, and then proceeds to step S12. On the other hand, when the accumulator pressure Pa is less than the first predetermined accumulator pressure Pd, the first control section 110 (the simultaneous driving determination section 112) determines "No" because it is necessary to promptly increase the accumulator pressure Pa to the first predetermined accumulator pressure Pd or higher, and then proceeds to step S16 described later.

In step S12, the first control section 110 (the simultaneous driving determination section 112) determines whether the accumulator pressure Pa input in step S11 is less than a second preset predetermined accumulator pressure Pd1 at which an increase in accumulator pressure Pa starts.

That is, when the accumulator pressure Pa is less than the second predetermined accumulator pressure Pd1, more specifically, when the accumulator pressure Pa is equal to or higher than the first predetermined accumulator pressure Pd and is less than the second predetermined accumulator pressure Pd1, the first control section 110 (the simultaneous driving determination section 112) determines "Yes" because it is necessary to increase the accumulator pressure Pa, and then proceeds to step S13. On the other hand, when the accumulator pressure Pa is equal to or higher than the second predetermined accumulator pressure Pd1, the first control section 110 (the simultaneous driving determination section 112) determines "No" because it is not necessary to increase the accumulator pressure Pa in the accumulator 13d, proceeds to step S17, and once ends the execution of the drive control program. Then, after the predetermined short time elapses, the first control section 110 again starts to execute the drive control program in step S10.

In step S13, the first control section 110 (the simultaneous driving determination section 112) inputs the pulse signals (wheel speeds) of the respective wheels FL, FR, RL and RR detected by the wheel speed sensors Sfl, Sfr, Srl and Srr. Then, the first control section 110 (the simultaneous driving determination section 112) calculates a vehicle speed V from the input pulse signals (wheel speeds), and determines whether the calculated vehicle speed V is equal to or less than a preset predetermined vehicle speed Vd (equal to or less than predetermined vehicle speed). Herein, the predetermined vehicle speed Vd is set to a vehicle speed at which the brake operating force (stroke) on the brake pedal 11 decreases and it is not necessary to boost the brake operating force by the servo pressure generating device 13, such as immediately before the vehicle stops, for example, When it is determined in step S13 that the vehicle speed V is equal to or less than the predetermined vehicle speed Vd, it is not necessary for the first control section 110 (the simultaneous driving determination section 112) to drive the upstream-side motor 13c2 to supply the high-pressure operating fluid from the pump 13c1 of the pressure supply section 13c to the regulator 13e. Therefore, since it is possible to supply the high-pressure operating fluid from the pump 13c1 to the accumulator 13d, the first control section determines "Yes" and proceeds to step S14. On the other hand, when the vehicle speed V is greater than the predetermined vehicle speed Vd, the first control section 110 determines "No" because it is necessary to supply the high-pressure operating fluid from the pump 13c1 to the regulator 13e to adjust (boost) the brake operating force in the master cylinder 12, and proceeds to step S16.

In step S14, the first control section 110 (the simultaneous driving determination section 112) determines whether it is necessary to dive the upstream-side motor 13c2 and the downstream-side motor 27 at the same time.

Specifically, the first control section 110 (the simultaneous driving determination section 112) determines that it is necessary to drive the upstream-side motor 13c2 by executing each step processing from step S11 to step S13. Also, the first control section 110 (the simultaneous driving determination section 112) acquires the motor drive state signal, which indicates a drive state (drive or stop) of the downstream-side motor 27, from the second control section 120 via the communication line Z. Herein, the second control section 120 may drive the downstream-side motor 27 so as to perform anti-skid control, ABS control and the like, for example. In this case, the second control section 120 outputs a signal, which indicates that the downstream-side motor 27 is driven or is being driven, as the motor drive state signal, to the first control section 110 (the simultaneous driving determination section 112) via the communication line Z.

Thereby, in a situation in which it is necessary to drive the upstream-side motor 13c2, when the downstream-side motor 27 is from now driven (or is being driven) in accordance with the motor drive state signal, the simultaneous driving determination section 112 determines "Yes" in step S14, which indicates that a result of the determination is in the affirmative, because it is necessary to drive the upstream-side motor 13c2 and the downstream-side motor 27 at the same time, and proceeds to step S15. On the other hand, in a situation in which it is necessary to drive the upstream-side motor 13c2, when the downstream-side motor 27 is continuously stopped in accordance with the motor drive state signal, the simultaneous driving determination section 112 determines "No", which indicates that a result of the determination is in the negative, because it is not necessary to drive the upstream-side motor 13c2 and the downstream-side motor 27 at the same time and only the upstream-side motor 13c2 is solely driven, and proceeds to step S16.

In step S15, the first control section 110 (the PWM control section 113) changes the duty ratio, which indicates a ratio of an on-time (pulse width) to a PWM control period in a PWM signal, so as to be smaller than a usual duty ratio, and drives the upstream-side motor 13c2 by the high-frequency duty control (PWM control) in which a PWM frequency is set to a higher frequency than usually. Also, the first control section 110 drives the downstream-side motor 27 to the full extent with respect to the second control section 120 by usual drive control, specifically, by the usual duty control, via the communication line Z.

In the case in which step processing of step S15 is executed, the upstream-side motor 13c2 and the downstream-side motor 27 are driven at the same time. As such, when starting to drive the upstream-side motor 13c2 and the downstream-side motor 27 at the same time, rush current is generated upon start of rotation of the upstream-side motor 13c2 and rush current is generated upon start of rotation of the downstream-side motor 27. At this time, when a timing at which the rush current of the upstream-side motor 13c2 is generated and a timing at which the rush current of the downstream-side motor 27 is generated overlap, total generated rush current increases, which imposes high burden (load) on the battery B configured to supply current (power).

In contrast, when the upstream-side motor 13c2 is driven by the high-frequency duty control, it is possible to reduce the current to be supplied to the upstream-side motor 13c2, as compared to the usual duty control. Thereby, even in a situation in which the upstream-side motor 13c2 and the downstream-side motor 27 are driven at the same time and the generation timings of the rush current overlap, the upstream-side motor 13c2 is driven by the high-frequency duty control and the total rush current is thus reduced, so that it is possible to significantly reduce the burden (load) to be imposed on the battery B.

In the situation in which step processing of step S15 is executed, the accumulator pressure Pa in the accumulator 13d is equal to or higher than the first predetermined accumulator pressure Pd, so that it is still possible to supply the high-pressure operating fluid to the regulator 13e. For this reason, the pump 13c1 is not required to early supply the operating fluid to the accumulator 13d by high responsiveness and high discharge pressure. That is, the upstream-side motor 13c2 that is driven simultaneously with the downstream-side motor 27 is not required to output a high driving force with good responsiveness.

On the other hand, the pumps 26a and 26b are required to drive the downstream-side motor 27 with good responsiveness, thereby supplying the control pressure to the wheel cylinders WC1 to WC4. That is, in the present embodiment, when driving the upstream-side motor 13c2 and the downstream-side motor 27 at the same time, if the downstream-side motor 27 is driven, the priority order of current supply from the battery B increases, as compared to a case in which the upstream-side motor 13c2 is driven. Therefore, in the present embodiment, while the first control section 110 drives the upstream-side motor 13c2, which is the first electric motor, by the high-frequency duty control, the second control section 120 drives the downstream-side motor 27, which is the second electric motor, to the full extent by the usual duty control.

In this way, in step S15, when the first control section 110 (the PWM control section 113) is enabled to drive the upstream-side motor 13c2 by the high-frequency duty control and the second control section 120 is enabled to drive the downstream-side motor 27 by the usual duty control, the processing proceeds to step S17, so that the execution of the drive control program is ended. Then, when the predetermined short time elapses, the first control section 110 again starts to execute the drive control program in step S10.

Also, when the first control section 110 determines "No" in each step processing of step S11, step S13 and step S14, the first control section proceeds to step S16. In step S16, the first control section 110 (the PWM control section 113) drives the upstream-side motor 13c2 to the full extent by the usual duty control, via the drive circuit 111. That is, the situation in which step S16 is executed is a situation in which the upstream-side motor 13c2 is driven to the full extent to cause the pump 13c1 to supply the operating fluid to the accumulator 13d with high responsiveness and high discharge pressure or only the upstream-side motor 13c2 is solely driven without driving the downstream-side motor 27. For this reason, the first control section 110 (the PWM control section 113) drives the upstream-side motor 13c2 to the full extent by the usual duty control, in step S16.

When the first control section 110 (the PWM control section 113) drives the upstream-side motor 13c2 by the usual duty control in step S16, the first control section proceeds to step S17, so that the execution of the drive control program is ended. Then, when the predetermined short time elapses, the first control section 110 again starts to execute the drive control program in step S10.

As described above, in the present embodiment, the first control section 110 executes the drive control program of FIG. 4. Thereby, for the accumulator pressure Pa in the accumulator 13d that changes as shown in FIG. 5, in a situation in which it is necessary for the first control section 110 to perform the simultaneous drive at time t1 in accordance with an in the affirmative result of the determination by the simultaneous driving determination section 112, the PWM control section 113 controls the drive of the upstream-side motor 13c2 by the high-frequency duty control.

Figure 5:
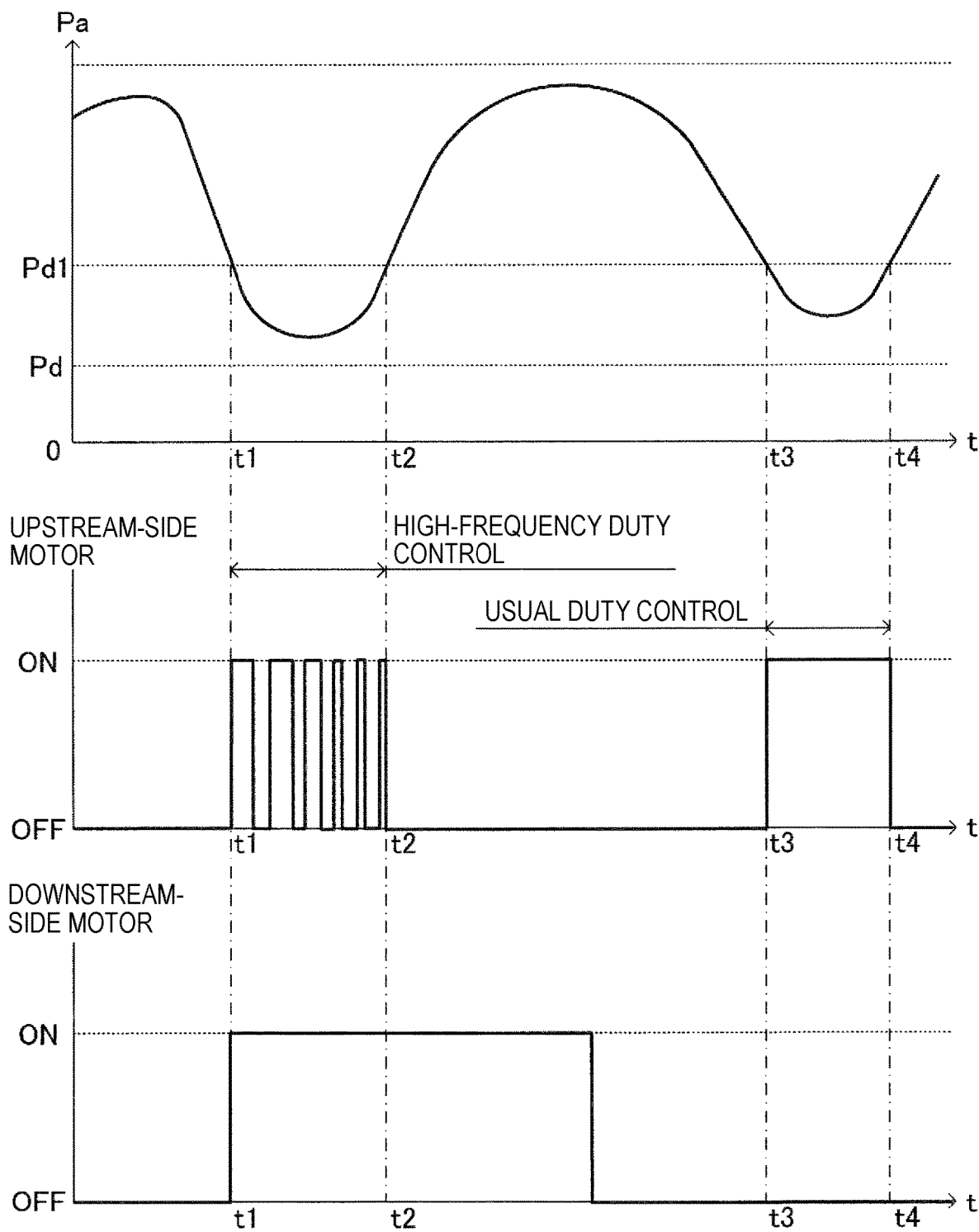
FIG. 5 is a timing chart for illustrating PWM control on electric motors during simultaneous drives thereof.

Specifically, as shown in FIG. 5, during a time period from time t1 to time t2 for which the accumulator pressure Pa is equal to or less than the second predetermined accumulator pressure Pd1 and is equal to or higher than the first predetermined accumulator pressure Pd and the upstream-side motor 13c2 and the downstream-side motor 27 are to be driven at the same time, the upstream-side motor 13c2 is driven by the high-frequency duty control and the downstream-side motor 27 is driven to the full extent. On the other hand, during a time period from time t3 to time t4 for which the accumulator pressure Pa is equal to or less than the second predetermined accumulator pressure Pd1 and is equal to or higher than the first predetermined accumulator pressure Pd and only the upstream-side motor 13c2 is to be driven, the first control section 110 drives the upstream-side motor 13c2 by the usual duty control.

Herein, as shown from time t1 to time t2 in FIG. 5, in a situation in which the accumulator pressure Pa recovers toward the second predetermined accumulator pressure Pd1, in other words, the accumulator pressure Pa increases, the PWM control section 113 changes the duty ratio in the high-frequency duty control so as to gradually decrease as the accumulator pressure Pa becomes greater, as compared to the first predetermined accumulator pressure Pd, which is a predetermined hydraulic pressure. Thereby, the accumulator pressure Pa is increased and a ratio of the off-time in the drive circuit 111 gradually increases, as compared to the on-time. Therefore, the current that is supplied from the battery B to the upstream-side motor 13c2 is reduced, so that the burden (load) imposed on the battery B is reduced in the situation in which the upstream-side motor 13c2 and the downstream-side motor 27 are driven at the same time.

As can be understood from the descriptions above, the hydraulic-pressure braking force generating device 1 as the vehicle brake device of the embodiment is the vehicle brake device including the upstream-side pressurization device 10 as the first pressurization device configured to pressurize and supply the operating fluid by the drive of the upstream-side motor 13c2 (the pump motor 13c2), which is the first electric motor, the downstream-side pressurization device 20 as the second pressurization device configured to pressurize and supply the operating fluid by the drive of the downstream-side motor 27 (the pump motor 27), which is the second electric motor, and the brake control device 100 as the control device configured to control the drives of the upstream-side motor 13c2 and the downstream-side motor 27 via the drive circuit 111 and the drive circuit 121 connected to the upstream-side motor 13c2 and the downstream-side motor 27, respectively, wherein the operating fluid pressurized by at least one of the upstream-side pressurization device 10 and the downstream-side pressurization device 20 is supplied to the wheel cylinders WC1, WC2, WC3 and WC4 provided to the wheels FL, FR, RL and RR of the vehicle, so that the wheels are applied with the hydraulic-pressure braking force. The brake control device 100 includes the simultaneous driving determination section 112 configured to determine whether it is necessary to drive the upstream-side motor 13c2 and the downstream-side motor 27 at the same time, and the PWM control section 113 that, when a result of the determination by the simultaneous driving determination section 112 is in the affirmative, changes the duty ratio of the PWM signal, which is to be output to the upstream-side motor 13c2 (via the drive circuit 111) that is at least one electric motor of the upstream-side motor 13c2 and the downstream-side motor 27, so as to be smaller than the duty ratio when a result of the determination by the simultaneous driving determination section 112 is in the negative, and drives the upstream-side motor 13c2 by the high-frequency duty control, which is the PWM control.

In this case, more specifically, the brake control device 100 includes the first control section 110 configured to control the drive by controlling the current, which is to be supplied to the upstream-side motor 13c2, via the drive circuit 111 that is the first drive circuit connected to the upstream-side motor 13c2, the second control section 120 configured to control the drive by controlling the current, which is to be supplied to the downstream-side motor 27, via the drive circuit 121 that is the second drive circuit connected to the downstream-side motor 27, and the communication line Z communicatively interconnecting the first control section 110 and the second control section 120, wherein the first control section 110 is provided with the simultaneous driving determination section 112 and the PWM control section 113, wherein the simultaneous driving determination section 112 is configured to acquire the drive state signal, which indicates a drive state of the downstream-side motor 27, from the second control section 120 via the communication line Z and to determine whether it is necessary to drive the upstream-side motor 13c2 and the downstream-side motor 27 at the same time, and wherein when a result of the determination by the simultaneous driving determination section 112 is in the affirmative, the PWM control section 113 drives the upstream-side motor 13c2 by the PWM control (high-frequency duty control).

According to the above configurations, when the simultaneous driving determination section 112 determines that it is necessary to drive the upstream-side motor 13c2 and the downstream-side motor 27 at the same time, i.e., when a result of the determination by the simultaneous driving determination section 112 is in the affirmative, the PWM control section 113 can drive the upstream-side motor 13c2, which is at least one electric motor of the upstream-side motor 13c2 and the downstream-side motor 27, by the PWM control in which the duty ratio has been changed so as to be smaller than the duty ratio when the upstream-side motor is solely driven (i.e., when a result of the determination by the simultaneous driving determination section 112 is in the negative). Thereby, even when driving the upstream-side motor 13c2 and the downstream-side motor 27 at the same time, it is possible to reduce the rush current of the upstream-side motor 13c2 that is driven by the PWM control (high-frequency duty control), and to reduce the total rush current at the time when the generation timing overlaps the generation timing of the rush current by the downstream-side motor 27.

Also, in the above cases, the upstream-side pressurization device 10 includes the accumulator 13d as the accumulator device configured to accumulate the hydraulic pressure of the operating fluid pressurized as a result of the drive of the upstream-side motor 13c2. When the accumulator pressure Pa, which is a hydraulic pressure in the accumulator 13d, is equal to or higher than the first predetermined accumulator pressure Pd that is equal to or higher than a preset predetermined hydraulic pressure, and when a result of the determination by the simultaneous driving determination section 112 is in the affirmative, the PWM control section 113 drives at least the upstream-side motor 13c2 by the PWM control.

According to the configuration, since the accumulator 13d can supply the accumulator pressure Pa to the regulator 13e, the priority order when supplying the current to the upstream-side motor 13c2 becomes lower than the priority order when supplying the current to the downstream-side motor 27. Therefore, the PWM control section 113 controls the upstream-side motor 13c2 having the lower priority order by the PWM control (high-frequency duty control), so that it is possible to reduce the rush current generated from the upstream-side motor 13c2 and to securely reduce the total rush current when driving the upstream-side motor 13c2 and the downstream-side motor 27 at the same time.

In this case, the PWM control section 113 executes the PWM control (high-frequency duty control) by decreasing the duty ratio corresponding to at least the upstream-side motor 13c2 as the accumulator pressure Pa in the accumulator 13d becomes greater, as compared to the first predetermined accumulator pressure Pd.

According to the configuration, it is possible to save the power consumption while driving the upstream-side motor 13c2 and the downstream-side motor 27 at the same time. Therefore, it is possible to reduce the burden (load) imposed on the battery B.

Also, in this case, when the vehicle speed V of the vehicle is equal to or less than the predetermined vehicle speed Vd that is equal to or less than a preset predetermined vehicle speed, and when a result of the determination by the simultaneous driving determination section 112 is in the affirmative, the PWM control section 113 executes the PWM control (high-frequency duty control).

According to the configuration, the vehicle speed V of the vehicle is decelerated to the predetermined vehicle speed Vd or less, so that a frequency of supplying the high master cylinder pressure from the master cylinder 12 to the wheel cylinders WC1 to WC4 decreases. For this reason, the priority order when supplying the current to the upstream-side motor 13c2 becomes lower than the priority order when supplying the current to the downstream-side motor 27. Therefore, the PWM control section 113 controls the upstream-side motor 13c2 having the lower priority order by the PWM control (high-frequency duty control), so that it is possible to reduce the rush current generated from the upstream-side motor 13c2 and to securely reduce the total rush current when driving the upstream-side motor 13c2 and the downstream-side motor 27 at the same time.

The implementation of the present invention is not limited to the embodiment, and a variety of changes can be made without departing from the object of the present invention.

For example, in the above embodiment, the first control section 110 includes the simultaneous driving determination section 112 and the PWM control section 113. Instead, as shown with a broken line in FIG. 3, the second control section 120 may be provided with a simultaneous driving determination section 122 and a PWM control section 123, which are similar to the simultaneous driving determination section 112 and the PWM control section 113.

Also, in the above embodiment, the first control section 110 controls the drive of the upstream-side motor 13c2 by the high-frequency duty control or the usual duty control, via the drive circuit 111. Instead, as required, the second control section 120 may be configured to control the drive of the downstream-side motor 27 by the high-frequency duty control or the usual duty control, via the drive circuit 121. In this case, the drive circuit 121 drives the downstream-side motor 27 as the on/off state of the semiconductor switching element is switched, in accordance with the PWM signal output from the second control section 120. Therefore, the drive circuit 121 adjusts the current to be supplied to the downstream-side motor 27, in accordance with the second control section 120 controlling a duty ratio, which indicates a ratio of an on-time (pulse width) to a PWM control period indicative of a switching frequency of an on-time and an off-time in the PWM signal, by pulse width control (the PWM control).

Also, in the above embodiment, the first control section 110 controls the drive of the upstream-side motor 13c2 by the high-frequency duty control or the usual duty control, via the drive circuit 111. In addition to this, the second control section 120 may be configured to control the drive of the downstream-side motor 27 by the high-frequency duty control or the usual duty control, via the drive circuit 121. In this case, as required, since the upstream-side motor 13c2 and the downstream-side motor 27 are driven by the high-frequency duty control, the rush current can be significantly reduced.

Also, in the above embodiment, the first control section 110 compares and determines the accumulator pressure Pa and the second predetermined accumulator pressure Pd1 by step processing of step S12 in the drive control program shown in FIG. 4, and compares and determines the vehicle speed V and the predetermined vehicle speed Vd in step S13. Instead, as required, at least one of the comparison and determination processing of the accumulator pressure Pa in step S12 and the comparison and determination processing of the vehicle speed V in step S13 may be omitted. When the comparison and determination processing of the accumulator pressure Pa or the comparison and determination processing of the vehicle speed V is omitted, the first control section 110 (the simultaneous driving determination section 112) executes each step processing of step S14 and thereafter, in accordance with a magnitude of the accumulator pressure Pa or a magnitude of the vehicle speed V. Also in this case, it is possible to reduce the total rush current when driving the upstream-side motor 13c2 and the downstream-side motor 27 at the same time, like the embodiment.

Also, for example, when the upstream-side motor 13c2 is driven so that the accumulator pressure Pa is to be periodically increased whenever a preset time elapses, the comparison and determination processing of the accumulator pressure Pa and the first predetermined accumulator pressure Pd in step S11 may be omitted, and both the determination processing of the accumulator pressure Pa and the determination processing of the vehicle speed V may be omitted. In this case, it is determined in step S14 whether it is necessary to drive the upstream-side motor 13c2 and the downstream-side motor 27 at the same time, in accordance with a timing at which the first control section 110 (the simultaneous driving determination section 112) drives the upstream-side motor 13c2, and when driving the motors at the same time (i.e., when a result of the determination is in the affirmative), the first control section 110 (the PWM control section 113) drives the upstream-side motor 13c2 by the high-frequency duty control, in step S15. Therefore, also in this case, it is possible to reduce the total rush current when driving the upstream-side motor 13c2 and the downstream-side motor 27 at the same time, like the embodiment.

Also, in the above embodiment, the first electric motor is the upstream-side motor 13c2 (the pump motor 13c2), and the second electric motor is the downstream-side motor 27 (the pump motor 27). In the meantime, the downstream-side pressurization device 20 that is the second pressurization device may have such configuration that each of the pumps 26a and 26b is provided with a pump motor (electric motor). In this case, for example, the pump motor configured to actuate the pump 26b configuring the rear wheel system may be set as the first electric motor, the pump motor configured to actuate the pump 26a configuring the front wheel system may be set as the second electric motor, and the second control section 120 may execute the drive control program shown in FIG. 4.

In this case, in order to stabilize behaviors of the vehicle upon braking, the second electric motor configured to actuate the pump 26a required to have high responsiveness and high discharge pressure is driven by the usual duty control. When driving the second electric motor and the first electric motor at the same time, the first electric motor configured to actuate the pump 26b is driven by the PWM control (high-frequency duty control). Thereby, it is possible to appropriately drive the first electric motor and the second electric motor at the same time. Even when the generation timings of the rush current overlap due to the simultaneous drive of the first electric motor and the second electric motor, it is possible to reduce the total rush current, and to appropriately reduce the load of the battery B configured to supply the current.

The invention claimed is:

1. A vehicle brake device comprising:
a first pressurization device configured to pressurize and supply an operating fluid by drive of a first electric motor;
a second pressurization device configured to pressurize and supply the operating fluid by drive of a second electric motor; and
a control device configured to control the drives of the first electric motor and the second electric motor via a drive circuit connected to each of the first electric motor and the second electric motor,
wherein the operating fluid pressurized by at least one of the first pressurization device and the second pressurization device is supplied to a wheel cylinder provided to a wheel of a vehicle, so that the wheel is applied with a hydraulic-pressure braking force, and
wherein the control device comprises:
a simultaneous driving determination section configured to determine whether it is necessary to drive the first electric motor and the second electric motor at the same time, and a PWM control section that, when a result of the determination by the simultaneous driving determination section is in the affirmative, changes a duty ratio of a PWM signal, which is to be output to at least one electric motor of the first electric motor and the second electric motor, so as to be smaller than a duty ratio when a result of the determination by the simultaneous driving determination section is in the negative, and drives the electric motor by PWM control.

2. The vehicle brake device according to claim 1, wherein the first pressurization device comprises an accumulator device configured to accumulate a hydraulic pressure of the operating fluid pressurized as a result of the drive of the first electric motor, and wherein when a hydraulic pressure in the accumulator device is equal to or higher than a preset predetermined hydraulic pressure, and when a result of the determination by the simultaneous driving determination section is in the affirmative, the PWM control section drives at least the first electric motor by the PWM control.

3. The vehicle brake device according to claim 2, wherein the PWM control section executes the PWM control by decreasing the duty ratio corresponding to at least the first electric motor as the hydraulic pressure in the accumulator device becomes greater, as compared to the predetermined hydraulic pressure.

4. The vehicle brake device according to claim 3, wherein when a vehicle speed of the vehicle is equal to or less than a preset predetermined vehicle speed, and when a result of the determination by the simultaneous driving determination section is in the affirmative, the PWM control section executes the PWM control.

5. The vehicle brake device according to claim 4, wherein the control device comprises:
a first control section configured to control the drive of the first electric motor, via a first drive circuit connected to the first electric motor,
a second control section configured to control the drive of the second electric motor, via a second drive circuit connected to the second electric motor, and
a communication line communicatively interconnecting the first control section and the second control section,
wherein at least the first control section is provided with the simultaneous driving determination section and the PWM control section,
wherein the simultaneous driving determination section is configured to acquire a drive state signal, which indicates a drive state of the second electric motor, from the second control section via the communication line and to determine whether it is necessary to drive the first electric motor and the second electric motor at the same time, and
wherein when a result of the determination by the simultaneous driving determination section is in the affirmative, the PWM control section drives the first electric motor by the PWM control.

6. The vehicle brake device according to claim 3, wherein the control device comprises:
a first control section configured to control the drive of the first electric motor, via a first drive circuit connected to the first electric motor,
a second control section configured to control the drive of the second electric motor, via a second drive circuit connected to the second electric motor, and
a communication line communicatively interconnecting the first control section and the second control section,
wherein at least the first control section is provided with the simultaneous driving determination section and the PWM control section,
wherein the simultaneous driving determination section is configured to acquire a drive state signal, which indicates a drive state of the second electric motor, from the second control section via the communication line and to determine whether it is necessary to drive the first electric motor and the second electric motor at the same time, and
wherein when a result of the determination by the simultaneous driving determination section is in the affirmative, the PWM control section drives the first electric motor by the PWM control.

7. The vehicle brake device according to claim 2, wherein when a vehicle speed of the vehicle is equal to or less than a preset predetermined vehicle speed, and when a result of the determination by the simultaneous driving determination section is in the affirmative, the PWM control section executes the PWM control.

8. The vehicle brake device according to claim 7, wherein the control device comprises:
a first control section configured to control the drive of the first electric motor, via a first drive circuit connected to the first electric motor,
a second control section configured to control the drive of the second electric motor, via a second drive circuit connected to the second electric motor, and
a communication line communicatively interconnecting the first control section and the second control section,
wherein at least the first control section is provided with the simultaneous driving determination section and the PWM control section,
wherein the simultaneous driving determination section is configured to acquire a drive state signal, which indicates a drive state of the second electric motor, from the second control section via the communication line and to determine whether it is necessary to drive the first electric motor and the second electric motor at the same time, and
wherein when a result of the determination by the simultaneous driving determination section is in the affirmative, the PWM control section drives the first electric motor by the PWM control.

9. The vehicle brake device according to claim 2, wherein the control device comprises:
a first control section configured to control the drive of the first electric motor, via a first drive circuit connected to the first electric motor,
a second control section configured to control the drive of the second electric motor, via a second drive circuit connected to the second electric motor, and
a communication line communicatively interconnecting the first control section and the second control section,
wherein at least the first control section is provided with the simultaneous driving determination section and the PWM control section,
wherein the simultaneous driving determination section is configured to acquire a drive state signal, which indicates a drive state of the second electric motor, from the second control section via the communication line and to determine whether it is necessary to drive the first electric motor and the second electric motor at the same time, and
wherein when a result of the determination by the simultaneous driving determination section is in the affirmative, the PWM control section drives the first electric motor by the PWM control.

10. The vehicle brake device according to claim 1, wherein when a vehicle speed of the vehicle is equal to or less than a preset predetermined vehicle speed, and when a result of the determination by the simultaneous driving determination section is in the affirmative, the PWM control section executes the PWM control.

11. The vehicle brake device according to claim 10, wherein the control device comprises:
  a first control section configured to control the drive of the first electric motor, via a first drive circuit connected to the first electric motor,
  a second control section configured to control the drive of the second electric motor, via a second drive circuit connected to the second electric motor, and
  a communication line communicatively interconnecting the first control section and the second control section,
  wherein at least the first control section is provided with the simultaneous driving determination section and the PWM control section,
  wherein the simultaneous driving determination section is configured to acquire a drive state signal, which indicates a drive state of the second electric motor, from the second control section via the communication line and to determine whether it is necessary to drive the first electric motor and the second electric motor at the same time, and
  wherein when a result of the determination by the simultaneous driving determination section is in the affirmative, the PWM control section drives the first electric motor by the PWM control.

12. The vehicle brake device according to claim 1, wherein the control device comprises:
  a first control section configured to control the drive of the first electric motor, via a first drive circuit connected to the first electric motor,
  a second control section configured to control the drive of the second electric motor, via a second drive circuit connected to the second electric motor, and
  a communication line communicatively interconnecting the first control section and the second control section,
  wherein at least the first control section is provided with the simultaneous driving determination section and the PWM control section,
  wherein the simultaneous driving determination section is configured to acquire a drive state signal, which indicates a drive state of the second electric motor, from the second control section via the communication line and to determine whether it is necessary to drive the first electric motor and the second electric motor at the same time, and
  wherein when a result of the determination by the simultaneous driving determination section is in the affirmative, the PWM control section drives the first electric motor by the PWM control.

* * * * *